United States Patent
Venit et al.

(10) Patent No.: US 8,209,309 B1
(45) Date of Patent: Jun. 26, 2012

(54) DOWNLOAD DETECTION

(75) Inventors: Aloysius J. Venit, Matthews, NC (US); David C. Shroyer, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 631 days.

(21) Appl. No.: 12/199,186

(22) Filed: Aug. 27, 2008

(51) Int. Cl.
  G06F 7/00 (2006.01)
  G06F 17/30 (2006.01)
(52) U.S. Cl. .................. 707/705; 707/712; 707/915
(58) Field of Classification Search .................. 707/705, 707/712, 758, 769, 781, 915
  See application file for complete search history.

(56) References Cited

U.S. PATENT DOCUMENTS

| | | | | |
|---|---|---|---|---|
| 5,796,952 A | * | 8/1998 | Davis et al. | 709/224 |
| 5,850,066 A | * | 12/1998 | Dew et al. | 219/109 |
| 6,707,465 B2 | * | 3/2004 | Yamazaki et al. | 345/629 |
| 7,924,325 B2 | * | 4/2011 | Okuda et al. | 348/231.4 |
| 8,032,912 B2 | * | 10/2011 | Tsutsui et al. | 725/80 |
| 2005/0174430 A1 | * | 8/2005 | Anderson | 348/207.1 |
| 2006/0224902 A1 | * | 10/2006 | Bolt | 713/193 |
| 2007/0182994 A1 | * | 8/2007 | Yoshida | 358/1.18 |
| 2007/0189333 A1 | * | 8/2007 | Naaman et al. | 370/477 |
| 2007/0296998 A1 | * | 12/2007 | Iwamoto et al. | 358/1.14 |
| 2007/0299915 A1 | * | 12/2007 | Shraim et al. | 709/206 |
| 2008/0137848 A1 | * | 6/2008 | Kocher et al. | 380/201 |
| 2009/0172129 A1 | * | 7/2009 | Singh et al. | 709/217 |
| 2009/0316890 A1 | * | 12/2009 | Schultz | 380/203 |

\* cited by examiner

*Primary Examiner* — Don Wong
*Assistant Examiner* — Merilyn Nguyen
(74) *Attorney, Agent, or Firm* — Michael A. Springs; Moore & Van Allen, PLLC; W. Kevin Ransom

(57) ABSTRACT

Embodiments of the invention relate to systems, methods, and computer program products for identifying devices used in connection with email and website spoofing. For example, the invention can be used to identify the device that was used to copy an image from a target website, where, after being copied, the image is used as part of a spoofed email or website. In an embodiment, a timer is embedded in an image residing on a web server that hosts a target website. The embedded timer is configured to record the time at which the image is removed from the web server and store that time in the image for later retrieval. Also, the time at which the image was removed, along with a device forensic of the device used to download the image, is stored in a database. If the image later appears as part of a spoofed email or website, the time at which the image was removed from the web server is obtained from the timer embedded in the image. Then, the database is searched for the corresponding time and device forensic, which can be used to identify the device used to copy the image from the target website.

17 Claims, 4 Drawing Sheets

DOWNLOAD DETECTION

FIELD

In general, embodiments of the invention relate to systems, methods, and computer program products for identifying devices used in connection with spoofed emails and websites and, more particularly, to identifying devices used to copy images from target emails and websites, where, after being copied, the images are used to construct spoofed emails and websites.

BACKGROUND

Phishing, commonly referred to as email spoofing, is the practice of attempting to misappropriate Internet users' passwords, financial or personal information, or introduce a virus attack, by masquerading as a creditable institution in an electronic communication. Phishing is often performed in combination with website spoofing, which is the technique of replicating an actual, well-known website. A common phishing technique involves luring unsuspecting Internet users to a spoofed website by using an authentic-looking email that appears to have been sent by the credible institution. For example, a phisher might send an email to customers of a credible institution, directing those customers to the spoofed website, which is a replica of the credible institution's actual website.

To appear authentic, the spoofed email and website may include actual images downloaded or otherwise obtained from the credible institution's website. For example, the spoofed email may instruct unsuspecting customers to login to their online account to update or confirm account information. The spoofed email may contain a link that, instead of directing users to the legitimate website, directs users to the spoofed website. There, users, because they believe the spoofed website is the legitimate website, willingly provide login details, such as username and password, and personal and financial information, such as credit card numbers, social security number, and mother's maiden name. Once this information is acquired, phishers may use customer information to create fake accounts. Phishers can then misappropriate large sums of money from financial institutions, while negatively affecting customers' credit.

There are several different techniques to combat phishing. For example, known anti-phishing software identifies phishing content contained in websites and emails, and notifies Internet users when spoofed websites and emails are masquerading as legitimate websites and emails. However, this type of software is not capable of identifying devices used to construct the spoofed websites and email, so that the phishers may be identified and successfully prosecuted.

SUMMARY

Embodiments of the invention relate to systems, methods, and computer program products for identifying devices used in connection with email and website spoofing. For example, the invention can be used to identify the device that was used to copy an image from a target website, where, after being copied, the image is used as part of a spoofed email or website. In an embodiment, a timer is embedded in an image residing on a web server that hosts a target website. The embedded timer is configured to record the time at which the image is removed from the web server and store that time in the image for later retrieval. Also, the time at which the image was removed, along with a device forensic of the device used to download the image, is stored in a database. If the image later appears as part of a spoofed email or website, the time at which the image was removed from the web server is obtained from the timer embedded in the image. Then, the database is searched for the corresponding time and device forensic, which can be used to identify the device used to copy the image from the target website.

BRIEF DESCRIPTION OF THE DRAWINGS

For a more complete understanding of the present invention, reference should now be had to the embodiments shown in the accompanying drawings and described below. In the drawings.

DETAILED DESCRIPTION OF EMBODIMENTS OF THE INVENTION

Figure 1:
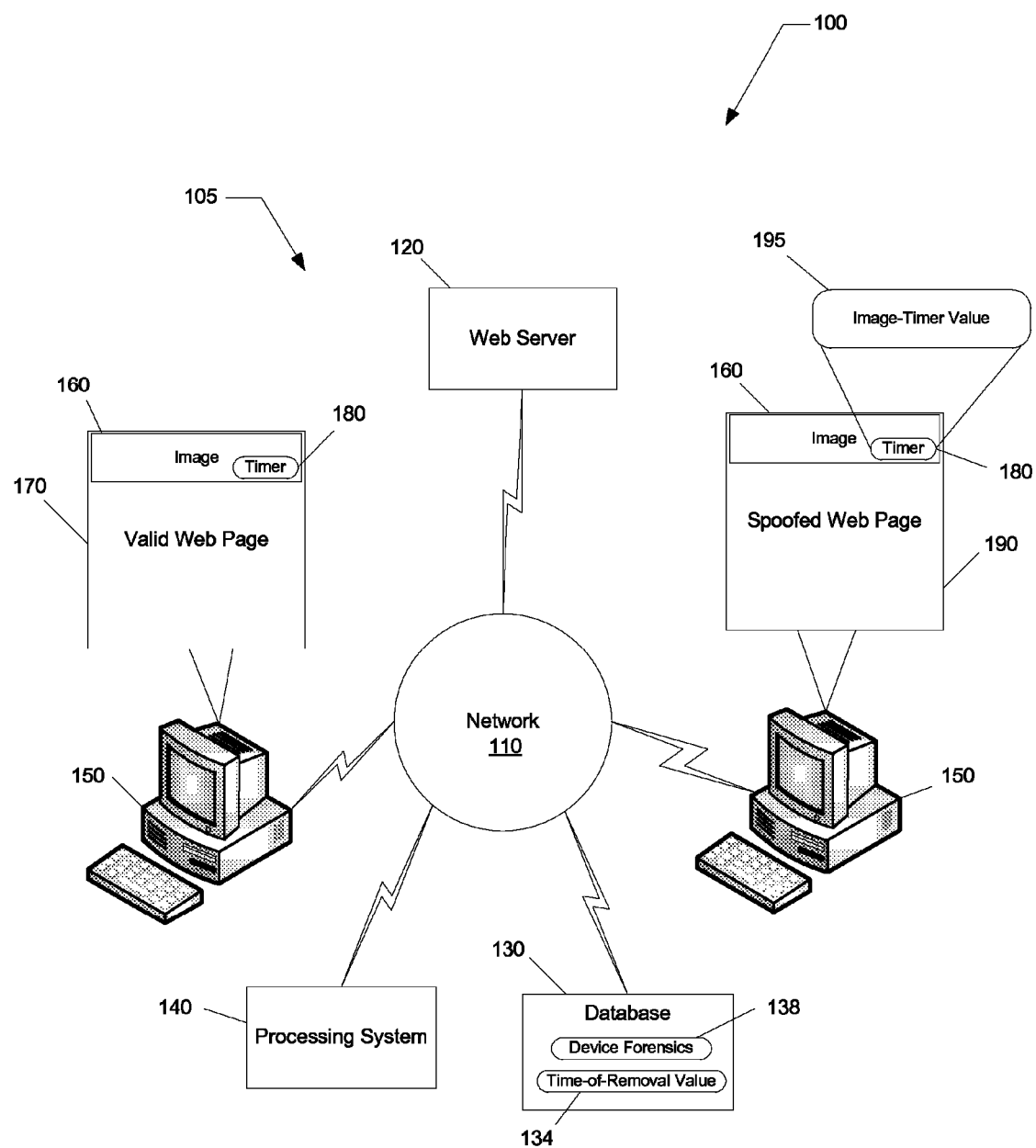
FIG. 1 illustrates an environment in which the processes and systems described herein are implemented according to one embodiment of the invention.

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.), or an embodiment combining software and hardware aspects that may generally be referred to herein as a "system." Furthermore, the present invention may take the form of a computer program product on a computer-readable medium having computer-usable program code embodied in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF) signals, or other mediums.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As a general overview, the systems, methods, and computer program products of embodiments of the present invention are useful for identifying a device that was used to download, copy, or otherwise remove an image from a web server. This is helpful for fighting email phishing and website spoofing. For example, individuals seeking to perform email phishing and website spoofing often legitimately visit a target website to copy select "high value" images from the target website. They may copy images of trademarks and products, and use those copied images to build a replica of the target website. These replica websites are commonly referred to as spoofed websites. Then, to lure unsuspecting Internet users to the spoofed website, individuals seeking to perform email phishing and website spoofing use the copied images to construct an authentic-looking email, also known as a spoofed email. For example, if the target website belongs to a bank, a spoofed email may be sent to unsuspecting bank customers, directing those customers to the spoofed website. The spoofed email may instruct unsuspecting bank customers to click on a link, which directs them to the spoofed website, where they are instructed to login and update or confirm their account information. Because bank customers believe the spoofed email is coming from their bank and because they believe the spoofed website is the bank's website, they willingly comply.

This enables the illegal capture of bank customers' login details, such as username and password, and personal and financial information, such as credit card numbers, social security numbers, and mothers' maiden name. Once this information is acquired, the customers' information may be used to create fake accounts to be used to misappropriate funds from the bank and adversely affect customers' credit. The present invention, by identifying the device used to copy images from the target website, is useful for identifying phishing emails and spoofed websites. For example, the present invention can be used to track the use of the copied images to the device that was used to generate the spoofed website. This data can help law enforcement catch and prosecute individuals associates with the phishing emails and spoofed website.

A brief overview of an exemplary embodiment will now be provided. The present invention considers embedding a timer in select "high value" images that reside on a web server and are presented to the public via a web browser as assets on a webpage. The timer is embedded in the image code itself and is not known or visible to users. The timer continues to count during its lifespan on the server. However, once the image is removed from the server, the timer stops counting and indicates an image-timer value, which is the time at which the image was copied, downloaded, or otherwise removed from the web server. This image-timer value stays embedded in the image, even when the image is loaded onto another web server and presented to the public via a spoofed website.

In this exemplary embodiment, the web server is configured to send a time-of-removal value to a database when the image is copied from the web server. For example, the web server may run a JavaScript that sends the time-of-removal value to the database. The time-of-removal value is the same value as the image-timer value. However, the time-of-removal value is stored in a database, whereas the image-timer value is embedded in the image. The web server is further configured to obtain and send to the database a device forensic, when the image is copied from the web server. The device forensic is an identifying characteristic of the device used to copy the image. For example, the device forensic may be an IP address, a serial number, or a browser version. Those skilled in the art will appreciate that the device forensic may be any number of identifying characteristics.

If a downloaded image reappears, hosted on a spoofed website, the present invention evaluates the timer embedded in the image to obtain the image-timer value, which, as mentioned above, represents the time at which the image was removed from the web server. For example, the present invention may evaluate the image code of the embedded timer to determine the image-timer value. The present invention then searches the database for the matching time-of-removal value, as provided by the web sever. In other words, the present invention searches the database for the time-of-removal value that is the same as the image-timer value. If the matching time-of-removal value is located in the database, then the device forensic associated with the matching time-of-removal value can be used to identify the device used to copy the image.

The present invention will now be described in more detail with reference to the drawing figures. FIG. 1 illustrates an operating environment 100 in which a download-detection system 105 may be implemented according to an embodiment of the present invention. The operating environment 100 includes a network 110 for facilitating communication between various components of the download-detection system 105, including a web server 120, a database 130, and a processing system 140. An image 160 resides on the web server 120 and is presented to users via a valid/target webpage 170, which can be accessed by way of a user terminal 150 that is connected to the network 110. The download-detection system 105 further includes a timer 180 that is embedded in the image 160. In an embodiment, the timer 180 is embedded in the image code and is not known or visible to a user viewing the image on the valid webpage 170.

The timer 180 is configured to continuously count while the image 160 is hosted on the web server 120, and the timer 180 is configured to stop counting when the image 160 is downloaded, copied, or otherwise removed from the web server 120. That is, the download-detection system 105 stops the timer 180 when the timer 180 is separated from the web server 120. For example, if the image 160 is copied from the web server 120, which hosts the valid webpage 170, the timer 180 stops counting and records an image-timer value 195. The image-timer value 195 indicates the time at which the timer 180 was removed from web server 120, and the image-timer value 195 remains stored in the image 160 after the image 160 is removed from the web server 120.

As described in more detail below, the processing system 140 is configured to determine and send to the database 130 a time-of-removal value 134 and a device forensic 138, when the image 160 is removed from the web server 120. The time-of-removal value 134, which indicates the time at which the image 160 was removed from the web server 120, is the same value as the image-timer value 195, which is recorded by the timer 180. The device forensic 138 is an identifying characteristic of the device used to remove the image 160 from the web server 120, and the device forensic 138 is determined when the image 160 removed from the web server 120. The time-of-removal value 134 and the device forensic 138 are stored together in the database 130 such that, if the time-of-removal value 134 is known, the processing system 140 can obtain the device forensic 138 by searching for the time-of-removal value 134.

If the image 160 is removed from a webpage 170 that is password protected, the processing system 140 is configured to obtain and send to the database 130 the user/customer identification that was used to login to the password-protected webpage 170. The processing system 140 is also configured to obtain and send to the database 130 any session information associated with the device used to remove the image 160 from the web server 120. For example, if a login was required to access the webpage 170, the processing system 140 may obtain and send to the database 130 the unique session identification or the user-agent string.

Figure 2:
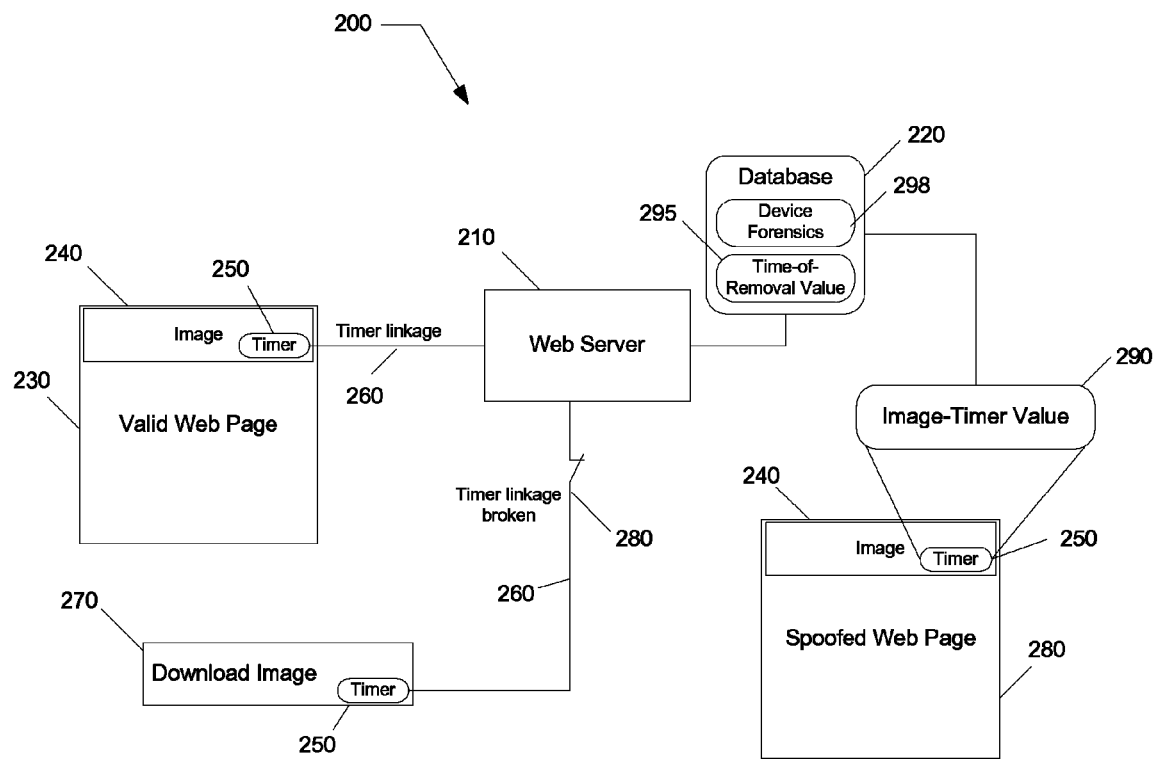
FIG. 2 is a schematic illustration of a download-detection system according to one embodiment of the present invention.

FIG. 2 schematically illustrates the operation of an exemplary download-detection system 200, according to one embodiment of the present invention. The download-detection system 200 illustrated in FIG. 2 includes a web server 210 in communication with a database 220 and a valid webpage 230, which a user may view via a user terminal (not shown). The valid webpage 230 includes an image 240 having a timer 250 embedded therein.

A timer linkage 260 establishes communication between the timer 250 and the web server 210. In the event the image 240 is downloaded from web server 210, as shown at 270, the timer linkage 260 breaks the connection between the web server 210 and the timer 250, as shown at 280. This stops the timer 250, and, accordingly, the time indicated by the timer 250 reflects the time at which the image 240 was downloaded or otherwise removed from the web server 210. This time value is sometimes referred to herein as the image-timer value 290. It should be appreciated that the image-timer value 290 can be a date and time, or the image-timer value can be an elapsed time from a baseline.

The web server 210 is configured to send a time-of-removal value 295 to the database 220 when the image 240 is removed form the web server 210. Accordingly, the image-timer value 290 is stored in the timer 250, which is embedding the image 240, and the time-of-removal value 295 is stored in the database 220. In this embodiment, the image-timer value 290 is the same value as the time-of-removal value 295. The web server 210 is also configured to obtain and send to the database 220 a device forensic 298 regarding the device used to download the image 240 from the web server 210.

If the image 240, which was downloaded from the web server 210, later appears on a spoofed webpage 280, the download-detection system 200 can be used to track down the device that was used to remove the image 240 from the web server 210. For example, the image-timer value 290, which corresponds to the time-of-removal value 295 stored in the database 220, can be obtained from the downloaded image 240, which is available to the public via the spoofed webpage 280. The database 220 can then be searched to locate the time-of-removal value 295, as was provided by the web server 210, that matches the image-timer value 290. Once the matching time-of-removal value 295 is located, the device forensic 298, which was also provided by the web server 210, that is associated with the matching time-of-removal value 295 is obtained. This device forensic 298 can then be used to identify the device that was used to download the image 240, which was later used to construct the spoofed webpage 280.

Figure 3:
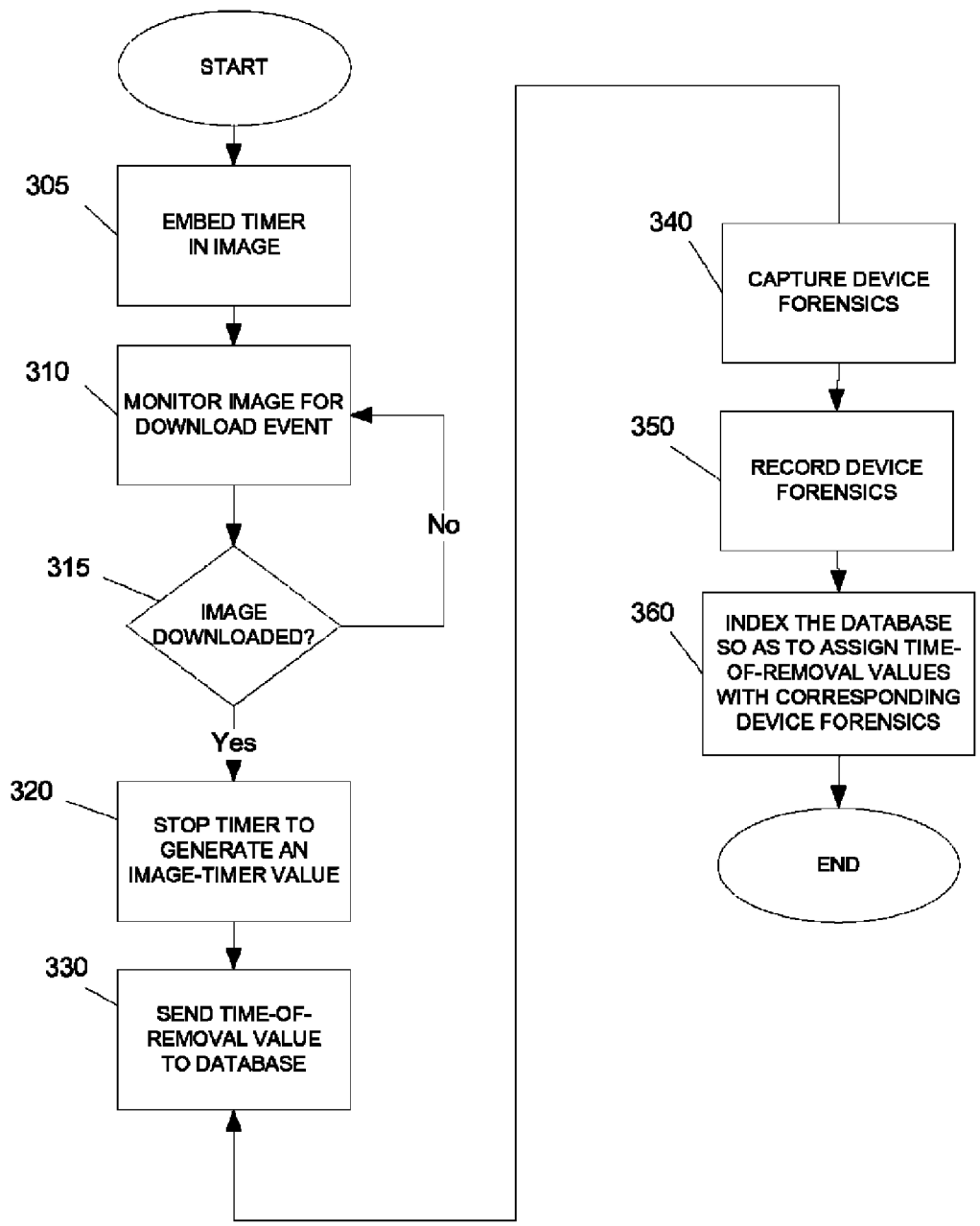
FIG. 3 is a flow chart illustrating an exemplary process of monitoring the removal of select images from a web server, in accordance to one embodiment of the present invention.

Exemplary operating procedures of the download-detection system 105 will now be described. Referring to FIG. 3, various procedures 300 are provided for monitoring the removal of select images 160 from the web server 120, according to an embodiment. In step 305, the timer 180 is embedded in the image 160. For example, the timer 180 may be embedded in the image code of the image 160. The timer 180, in an embodiment, is linked to the web server 120 such that the timer 180 is synchronized with an internal clock of the web server 120. Next, in step 310, the processing system 140 monitors for a download event. For example, the processing system 140 monitors a linkage, such as timer linkage 260, that connects the timer 180 to the web server 120, wherein the linkage is configured to break when the image 160 is removed from the web server 120.

In step 315, if there has not been a download event, the processing system 140 returns to step 310, where it continues monitoring for a download event. If there has been a download event, the processing system 140 proceeds to step 320, where it stops the timer 180. The processing system 140 may stop the timer 180 by breaking the linkage that connects the timer 180 and the web server 120. When stopped, the timer 180 indicates the image-timer value 195, and the timer 180 can be evaluated later to determine the image-timer value 195. It should be appreciated that steps 310, 315, and 320 can occur instantaneously. Next, in step 330, the processing system 140 records a time-of-removal value 134. For example, the processing system 140 obtains the image-timer value 195 from the timer 180 and then sends the image-timer value 195 to the database 120, where the image-timer value 195 is saved as the time-of-removal value 134. Also, for example, if the internal clock of the web server 120 is synchronized with the timer 180, instead of sending the image-timer value 195, the processing system 140 may send to the database 120 the time, according to the internal clock, when the image 160 is removed from the web server 120. This time is stored in the database 130 as the time-of-removal value 134.

In step 340, the processing system 140 captures device forensics 138 about the device that was used to download the image 160 from the web server 120. For example, the processing system 140 may run a surveillance program for detecting device forensics 138. The processing system 140, running the surveillance program, may perform browser detection to retrieve device forensics 138, such as the web browser name, version, JavaScript, plug-ins, screen resolution, IP address, cookies, and language. Also for example, the surveillance program may be configured to obtain device forensics 138, such as the MAC address, open ports, a list of running programs, operating system type, version and serial number, the device's registered owner and registered company name, the current logged-in user name and the last-visited URL.

In step 350, the processing system 140 records the captured device forensics 138 by sending the forensics 138 to the database 130. In step 360, the database 130 is indexed such that the appropriate device forensics 138 are associated with the corresponding time-of-removal value 134. That is, each time-of-removal value 134, which is reported to the database 130 from the web server 120, is associated with the device forensics 138 of the device that removed the image 160 at that time-of-removal value 134. This enables the processing system 140 to retrieve the device forensics 138 of the device that removed the image 160 by searching the database 130 for a specific time-of-removal value 134.

Figure 4:
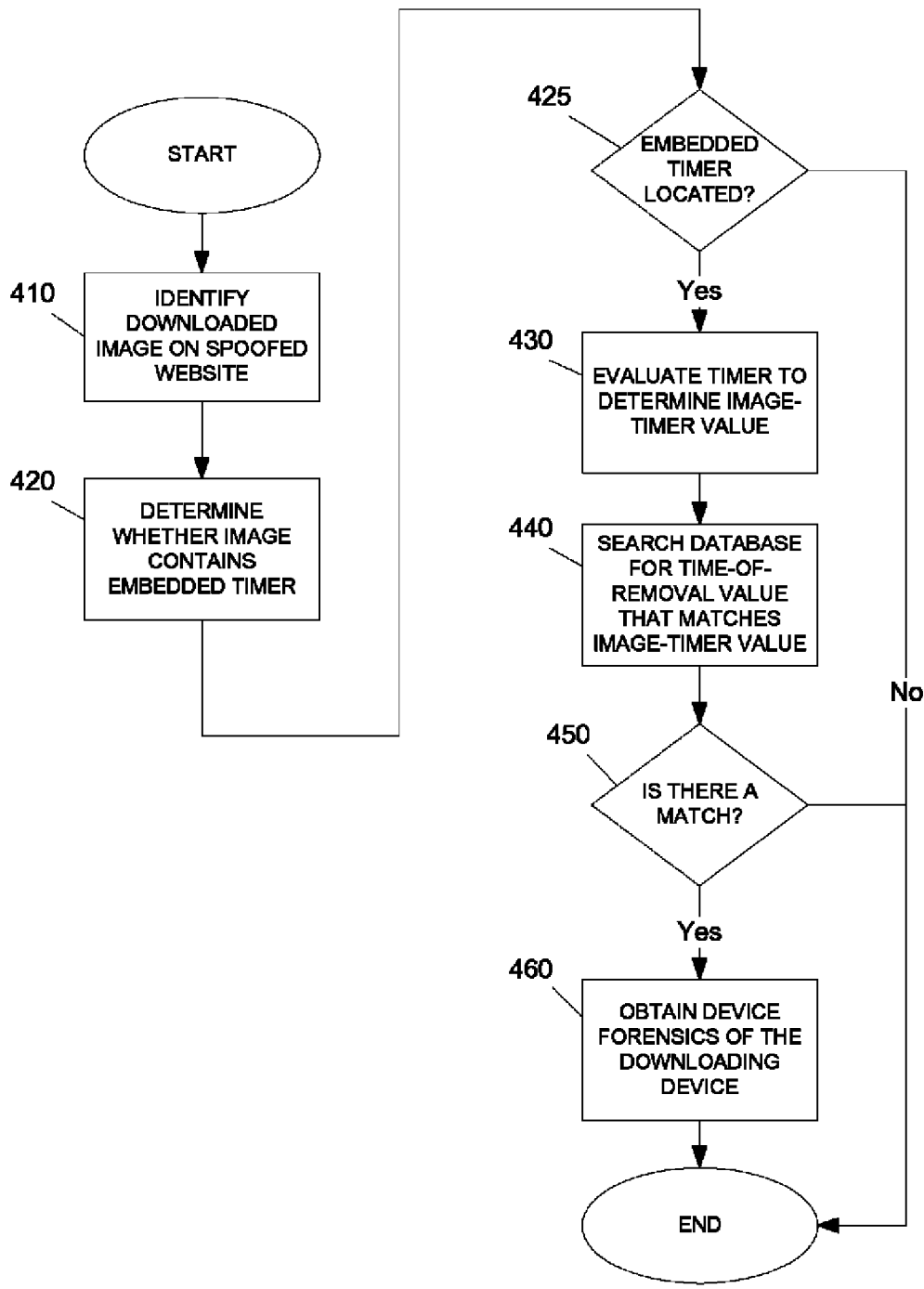
FIG. 4 is a flow chart illustrating an exemplary process of identifying the device used to remove an image from a web server, in accordance to one embodiment of the present invention.

Because, in an embodiment, the time-of-removal value 134 is the same as the image-timer value 195 of the embedded timer 180, the processing system 140 can obtain the device forensics 138 of the device that downloaded the image 160 by searching the database 130 for a time-of-removal value 134 equal to the image-timer value 195. This procedure will be described in more detail with reference to FIG. 4, which provides exemplary procedures 400 for identifying the device used to download the image 160 from the web server 120.

In step 410, the image 160 is identified on the spoofed webpage 190. It should be appreciated that step 410 may be accomplished in a number of ways. For example, a user who is familiar with the select, high value images of the target company's website may observe the image 160 on the spoofed webpage 190. Likewise, victims of the spoofed webpage 190 may notify the target company of the spoofed webpage 190. Also, for example, the processor 140 may be programmed to search for and identify the image 160. Occasionally, identified images 160 do not contain a timer 180, because, for example, the timer 180 was stripped from the image 160 or the image was recreated without a timer 180. Accordingly, the processing system 140, in step 420, evaluates the image 160 to determine whether the timer 180 is embedded therein.

In step 425, if the timer 180 is not located, the processing system 140 skips to the end of procedures 400 because, without the timer 180, the device used to download the image 160 cannot be identified. However, if the timer 180 is located, the processing system 140 proceeds to step 430 and evaluates the timer 180 to determine the image-timer value 195. Then, in step 440, the processing system 140 searches a plurality of weblogs stored in the database 130 to find the time-of-removal value 134, as provided to the database 130 by the web server 120 when the image 160 was removed from the web server 120, that matches the image-timer value 195. The processing system 140, in step 450, skips to the end if no match is located. However, if a match is located, the processing system 140 continues to step 460, where the processing system 140 obtains the device forensics 138 that are stored in the weblog, along with the matching time-of-removal value 134. The processing system 140 then presents the device forensics 138 to the users. This enables users to identify the device used to download the image 160, and helps law enforcement prosecute individuals associated with the phishing emails and spoofed websites.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method, comprising:
embedding a timer in an image located on a web server, wherein the timer embedded in the image is configured to continuously increment time as long as the image is hosted on the web server and the timer is configured to stop counting when the image is downloaded from the web server so that the downloaded image comprises an image-timer value embedded in the image indicating a time at which the image was downloaded from the web server;
detecting, via a computing processor, that the image has been downloaded from the web server;
determining, via a computing processor, the time at which the image was downloaded;
sending to a database the time at which the image is downloaded from the web server; and
using, via a computing processor, the time at which the image is downloaded from the web server to identify a device used to download the image from the web server.

2. The method of claim 1, further comprising:
capturing, via a computing processor, a device forensic of the device used to download the image from the web server.

3. The method of claim 2, wherein capturing the device forensic occurs at the time the image is downloaded from the web server.

4. The method of claim 2, further comprising:
sending, via a computing processor, to the database the device forensic of the device used to download the image from the web server.

5. The method of claim 4, further comprising:
identifying the image in an electronic communication.

6. The method of claim 5, further comprising:
determining whether the image contains the timer.

7. The method of claim 5, further comprising:
evaluating, via a computing processor, the image-timer value embedded in the image to determine the time at which the image was downloaded from the web server.

8. The method of claim 7, further comprising:
searching, via a computing processor, the database for the time at which the image was downloaded from the web server.

9. The method of claim 8, further comprising:
obtaining, via a computing processor, from the database the device forensic of the device used to download the image from the web server, wherein the device forensic is stored in the database along with the time at which the image was downloaded from the web server.

10. The method of claim 5, wherein the electronic communication is a spoofed website.

11. The method of claim 5, wherein electronic communication is a spoofed email.

12. The method of claim 1, wherein the timer is code built within the image.

13. The method of claim 1, further comprising:
capturing, via a computing processor, a session information associated with the device used to download the image from the web server.

14. The method of claim 1, further comprising:
capturing, via a computing processor, a customer identification associated with the device used to download the image from the web server.

15. The method of claim 1, wherein a JavaScript is provided for passing the time at which the image was downloaded from the server from the web server to the database.

16. The method of claim 1, wherein the embedded timer indicates both a date and time and the image-timer value comprises the time and date the image was downloaded.

17. The method of claim 1, wherein the embedded timer is an elapsed timer and the image-timer value comprises an elapsed time from when the timer started and when the image was downloaded.

* * * * *